United States Patent

Ehrlinger et al.

(10) Patent No.: US 6,817,327 B2
(45) Date of Patent: Nov. 16, 2004

(54) ELECTRODYNAMIC DRIVE TRAIN

(75) Inventors: Friedrich J. Ehrlinger, Friedrichshafen (DE); Michael Roske, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/278,110

(22) Filed: Oct. 21, 2002

(65) Prior Publication Data

US 2003/0075133 A1 Apr. 24, 2003

(30) Foreign Application Priority Data

Oct. 24, 2001 (DE) .......................................... 101 52 471

(51) Int. Cl.[7] ............................................... F02N 11/14
(52) U.S. Cl. ........................... 123/179.22; 475/4; 477/4
(58) Field of Search ...................... 123/179.22; 475/4, 475/5, 8; 477/4, 185, 194

(56) References Cited

U.S. PATENT DOCUMENTS

| 5,558,175 A | * | 9/1996 | Sherman | .................... 180/65.2 |
| 5,735,770 A | * | 4/1998 | Omote et al. | .................. 475/5 |
| 5,895,333 A | * | 4/1999 | Morisawa et al. | .............. 475/5 |
| 6,240,890 B1 | | 6/2001 | Abthoff et al. | ........... 123/179.3 |
| 6,666,787 B2 | * | 12/2003 | Doepke | .......................... 475/5 |

FOREIGN PATENT DOCUMENTS

| DE | 89 14 904.1 | 3/1990 | ........... F02B/11/04 |
| DE | 198 52 085 C1 | 2/2000 | ........... F02N/15/00 |
| DE | 199 13 519 A1 | 9/2000 | ........... F02N/11/04 |
| DE | 199 34 696 A1 | 5/2001 | ............ B60K/6/02 |

* cited by examiner

Primary Examiner—Mahmoud Gimie
Assistant Examiner—Arnold Castro
(74) Attorney, Agent, or Firm—Davis & Bujold, P.L.L.C.

(57) ABSTRACT

A method for starting an internal combustion engine (4) in a vehicle equipped with an electrodynamic drive system (2), which is comprised of an electric motor (24) and a planetary transmission (14) between the internal combustion engine (4) and a manual transmission (6) with an input shaft (28), provides that first the electric motor (24) is accelerated to a speed that is fundamentally sufficient to start the internal combustion engine (4); this is followed by a controlled closing of a brake (32) designed to halt the rotation of the input shaft (28) of the manual transmission (6) against a stationary housing component (34), whereby a level of torque that represents the sum of electromotive torque and rotational torque of the rotating components acts upon the internal combustion engine (4).

4 Claims, 3 Drawing Sheets

ELECTRODYNAMIC DRIVE TRAIN

FIELD OF THE INVENTION

The invention relates to an electrodynamic drive system.

BACKGROUND OF THE INVENTION

Electrodynamic systems are suggested in various systems as assemblies between an internal combustion engine and a transmission in a vehicle. In DE 199 34 696 A1, for example, an electrodynamic drive system for a vehicle is described, which is equipped with a planetary transmission positioned between a drive engine and a manual transmission, which comprises the three elements sun gear, internal gear, and planet carrier. The planet carrier, as the first element, is connected to the manual transmission; the internal gear, as the second element, is connected to the drive engine; and the sun gear, as the third element, is connected to at least one electric motor. This assembly allows the drive engine to be started, electrical power to be generated, power braking, and the vehicle to be started from a position of rest. No special solutions for starting the drive engine under cold-start conditions are described in DE 199 34 696.

With known-in-the-art crankshaft-starter generators, the cold-start torque of the internal combustion engine must be overcome, and the device must still be capable of accelerating the rotating masses to the necessary starting speed. This means that the electric motor of the crankshaft-starter generator must generate higher levels of torque than simply the cold-start torque of the internal combustion engine. The principal disadvantage of this arrangement is that two opposing requirements, namely cold-start and generator operation, are placed upon the same electric motor at higher speeds for the internal combustion engine. In order to obtain the high mechanical torque for a cold start, the speed that corresponds to a preset output for the electric motor must be set very low. Thus, to cover the entire speed band for the internal combustion engine in the operation of the electric motor as a generator, a broad field weakness range for the electric motor is necessary. This broad field weakness range results in a poor efficiency level in generator operation at higher internal combustion engine speeds. The required high levels of torque also require high engine flow rates, resulting in high costs for the required power electronics.

With known-in-the-art pulse starters, an electric motor is connected to the crankshaft on the side of the internal combustion engine via a clutch. On the transmission side, a conventional starter coupling with a torsion damper is positioned between the electric motor and the clutch input shaft. In order to avoid the above-named disadvantages related to the electric motor and the power electronics, both couplings are opened in the pulse starters used to start the internal combustion engine. The electric motor accelerates only its own rotating mass, and once the flywheel starting speed has been reached, the clutch on the side of the internal combustion engine is closed. This way, the flywheel effect and the torque of the electric motor can be used to cold-start the internal combustion engine. The clutch on the side of the internal combustion engine must be designed to be as strong as, or even stronger than, the starter coupling on the transmission side, since during driving operation it must transmit all static and dynamic internal combustion engine torque, resulting in a heavy weight and high costs. An additional storage mass required for the intermediate storage of the friction energy of the disconnect-type clutch during a flywheel start further adds to the heavy weight of the assembly.

The electric motor must have its own bearing, since it must be brought to the flywheel start speed independent of the internal combustion engine and the transmission. The additional clutch and the devices required for its operation necessitate a large overall length.

The objective of the invention is to provide a starter assembly for use under cold-start conditions, which will eliminate the above-described disadvantages.

The objective is attained with an electrodynamic drive system having the characteristic features specified in claim 2, and a method according to claim 1. Designs are the object of the sub-claims.

SUMMARY OF THE INVENTION

According to the invention, in an electrodynamic vehicle drive system comprised of an electric motor and a planetary transmission positioned between an internal combustion engine and a manual transmission with an input shaft, a frictionally engaged brake is provided to enable a controlled braking of the input shaft of the manual transmission against a stationary component of the housing. In a method that utilizes this type of drive system, first, with the transmission in neutral, the electric motor is accelerated to a speed that is principally sufficient to start the internal combustion engine. A controlled closing is effected via the brake, causing the input shaft of the manual transmission to move toward the stationary housing component. A level of torque that represents the sum of electric motor torque and rotational torque of the mass of rotating components acts upon the internal combustion engine, which will start the internal combustion engine reliably and quickly, even at low temperatures with the associated aggravated starting conditions. In one advantageous design, the brake is connected to the planet carrier of the planetary transmission, which is connected via a rigid revolving joint to the input shaft of the manual transmission. In another design, the brake is connected to a countershaft of the manual transmission, which is connected via a rigid revolving joint to the input shaft of the manual transmission.

BRIEF DESCRIPTION OF THE DRAWINGS

The invention will now be described, by way of example, with reference to the accompanying drawings in which.

DETAILED DESCRIPTION OF THE INVENTION

Figure 1:
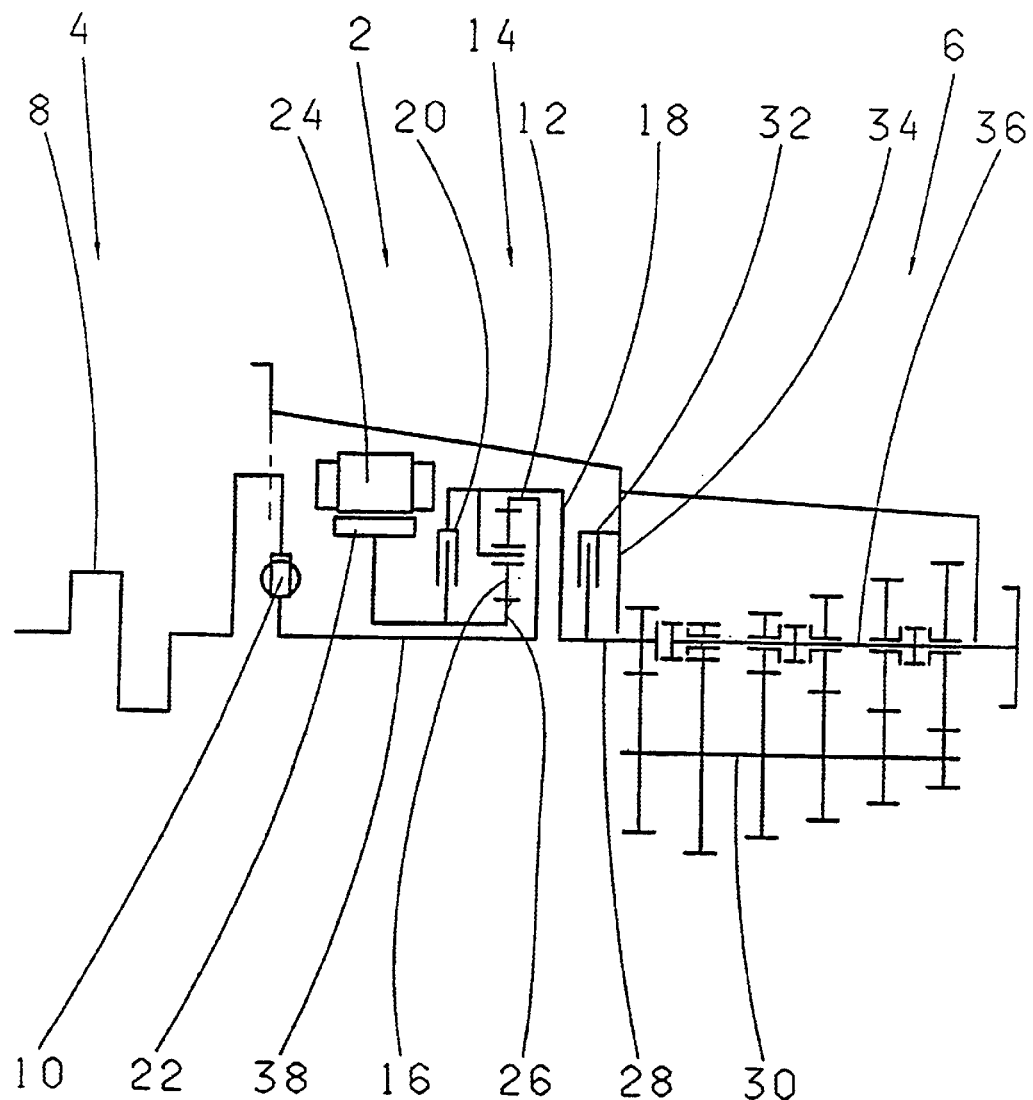
FIG. 1 is a schematic representation of the assembly.
Figure 1A:
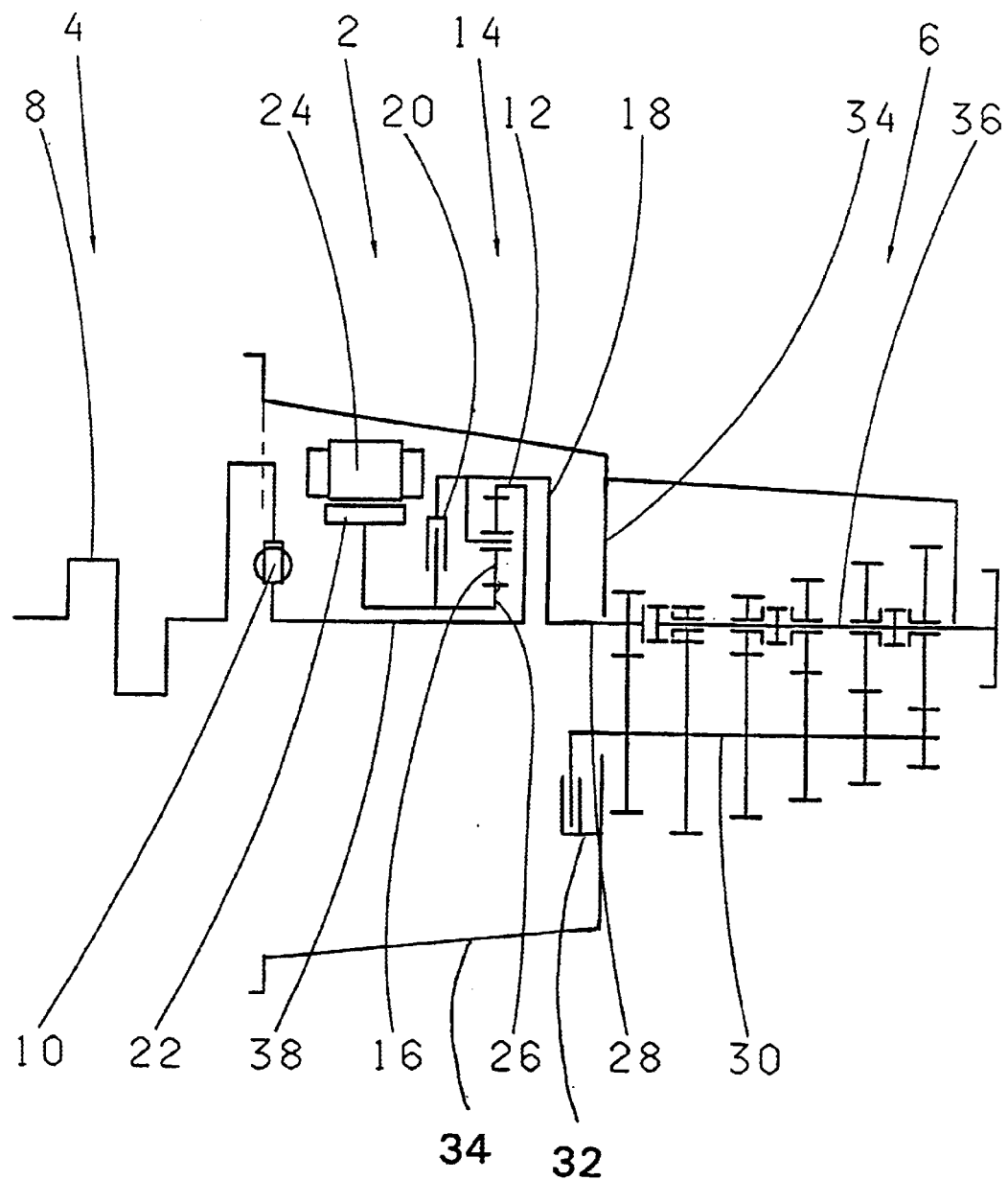

FIG. 1 shows a schematic representation of an electrodynamic drive system 2, positioned between an internal combustion engine 4 and a manual transmission 6. The internal gear 12 of a planetary transmission 14 is driven by the crankshaft 8 of the internal combustion engine 4, via a damping device 10. Planetary gears 16 mesh with the internal gear 12, and are arranged on a planet carrier 18 in such a way that they can rotate. The planet carrier 18 is connected to a friction clutch 20, via which the rotor 22 of an electric motor 24 can be connected to the planet carrier 18 such that it cannot rotate. The sun gear 26 of the planetary transmission 14 is also connected to the rotor 22 in such a way that it cannot rotate. The planet carrier 18 is rigidly connected to the input shaft 28 of the manual transmission 6, and the gearing of the manual transmission meshes with gearing on the countershaft 30 in the manual transmission 6. Other gearing on the countershaft 30 meshes with gearing of an output shaft 36. The input shaft 28 can be rigidly connected to the housing 34 of the manual transmission 6, via a frictionally engaged brake 32.

At the beginning of the starting process, the entire drive train is idle, and the manual transmission 6 is in neutral. The brake 32 and the clutch 20 are open. The electric motor 24 accelerates to a speed that is necessary to enable the flywheel start. This causes the sun gear 26 to rotate, while the internal gear 12 is held stationary by the still stationary internal combustion engine 4. At the same time, the planet carrier 12 and the input shaft 28 connected to it rotate at a speed that is reduced by the planetary transmission 14. Via a controlled closing of the brake 32, torque and speed are generated in the internal gear shaft 38, which is connected to the internal gear 12; this torque and speed are comprised of the amount of electromotive torque and the flywheel effect of the rotating masses. After the brake 32 has been completely closed, the input shaft 28 becomes stationary. From this point on only the electromotive torque that has been increased by the factor of the gear ratio reduction of the planetary transmission 14 acts upon the internal gear shaft 38, and upon the crankshaft 8 via the damping element 10.

Figure 2:
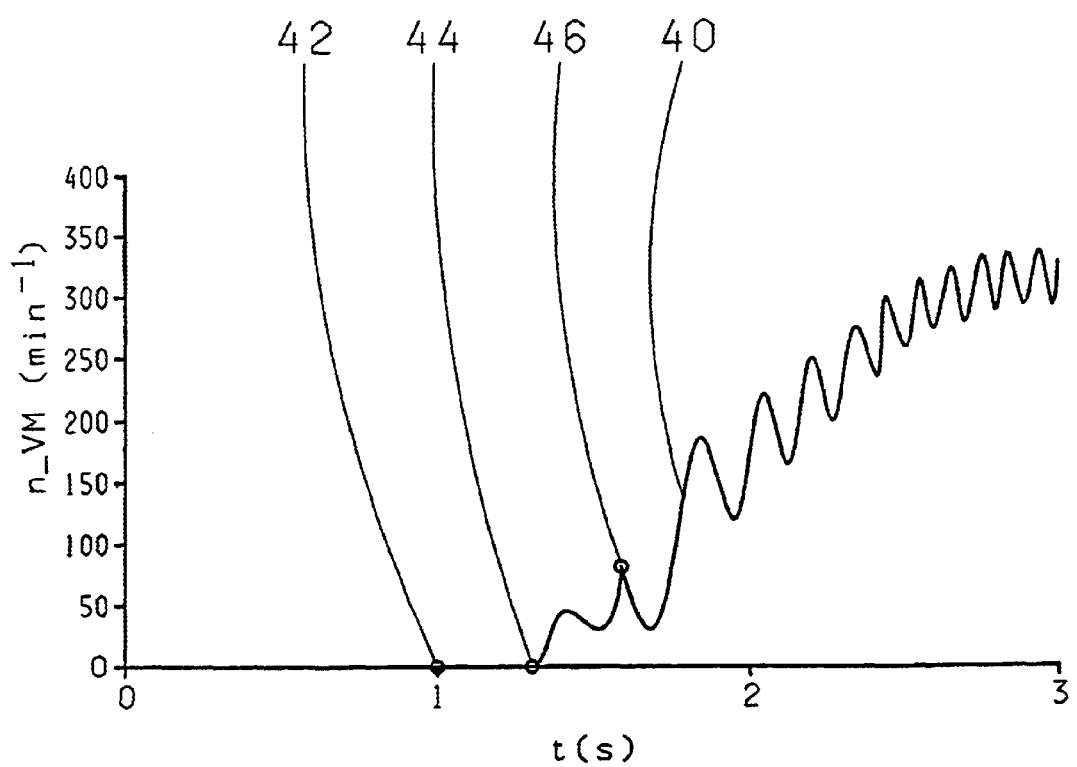
FIG. 2 is a progression of the starter speed for the crankshaft.

In FIG. 2, the progression of the crankshaft speed n_VM over the time t is represented by the curve 40. Up to the point on the curve 42 the electric motor 24 is accelerated. After the point on the curve 42 the brake 32 is closed. After the point on the curve 44 a degree of torque, resulting from the electromotive torque and the flywheel effect, has developed on the internal gear shaft 38, which is sufficient to place the crankshaft 8 in rotation. The speed of the crankshaft n_VM increases up to the point on the curve 46, at which the brake 32 is completely closed, and the input shaft 28 and the planet carrier 18 are stationary. Due to the lack of additional motor force, the crankshaft speed n_VM again drops after the point on the curve 46. However, at this point the electromotive torque of the internal gear shaft 38 and the electrical energy already stored in the rotating mass are sufficient to push the internal combustion engine 4 up to the necessary starting speed, and to maintain this speed until the internal combustion engine 4 is ignitable.

The design of the flywheel of the internal combustion engine can be simplified over that of known starter systems, and the flywheel ring gear can be eliminated. An additional design for a conventional flywheel starter for use in extreme cold-start conditions can also be eliminated.

REFERENCE NUMBERS

2 Electrodynamic Drive System
4 Internal Combustion Engine
6 Manual Transmission
8 Crankshaft
10 Damping Device
12 Internal Gear
14 Planetary Transmission
16 Planetary Gear
18 Planet Carrier
20 Friction Clutch
22 Rotor
24 Electric Motor
26 Sun Gear
28 Input Shaft
30 Countershaft
32 Brake
34 Housing
36 Output Shaft
38 Internal Gear Shaft
40 Curve
42 Point on Curve
44 Point on Curve
46 Point on Curve

What is claimed is:

1. A method for starting an internal combustion engine (4) in a vehicle that is equipped with an electrodynamic drive system (2) having an electric motor (24) and a planetary transmission (14) positioned between the internal combustion engine (4) and a manual transmission (6) with an input shaft (28), the method comprising the steps of:

first accelerating the electric motor (24) to a speed sufficient to start the internal combustion engine (4); and controlling closing of a brake (32) designed to halt the rotation of the input shaft (28) of the manual transmission (6) against a stationary housing component (34), whereby a level of torque representing the sum of electromotive torque and rotational torque of the rotating components acts upon the internal combustion engine (4).

2. An electrodynamic drive system (2) for a vehicle, comprising:

an electric motor (24) and a planetary transmission (14) positioned between an internal combustion engine (4) and a manual transmission (6) with an input shaft (28), and a brake (32) for the controlling braking of the input shaft (28) of the manual transmission (6) relative to a stationary component of the housing (34).

3. The electrodynamic drive system (2) according to claim 2, wherein the brake (32) is connected to a planet carrier (18) of the planetary transmission (14) that is rigidly connected to the input shaft (28) of the manual transmission (6), such that the planet carrier (18) can rotate.

4. The electrodynamic drive system (2) according to claim 2, wherein the brake (32) is connected to a countershaft (30) of the manual transmission (6) that is rigidly connected to the input shaft (28) of the manual transmission (6), such that the countershaft can rotate.

* * * * *